2,983,570
POROUS MOULDS FOR MANUFACTURING PLASTIC ARTICLES

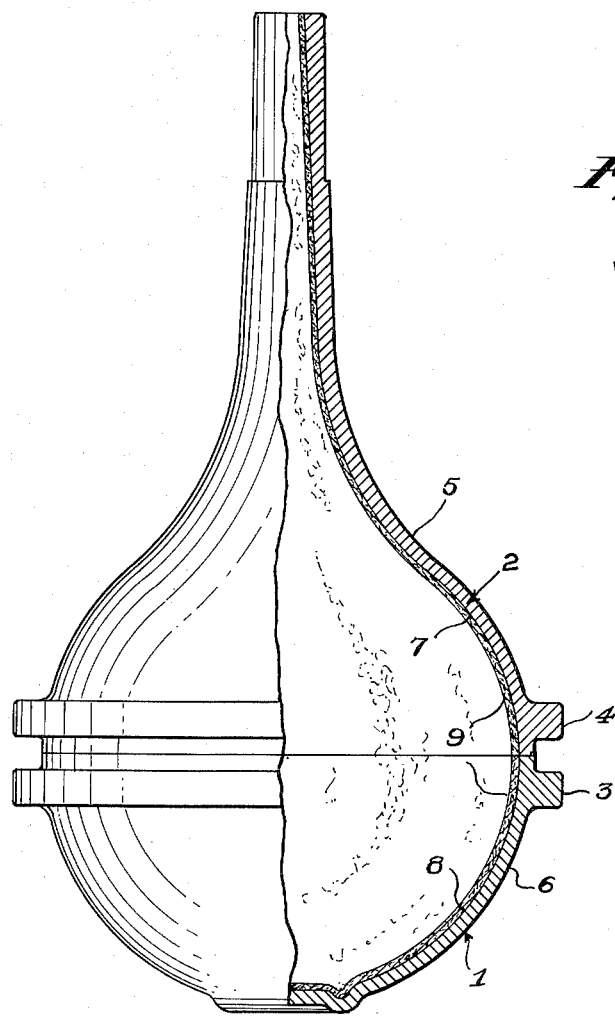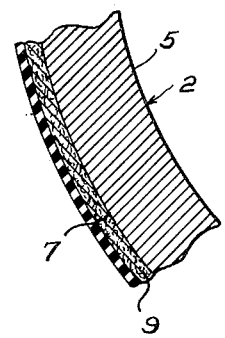

Benno Lux, Carouge, Geneva, Switzerland, assignor to Pirelli Societa per Azioni, Milan, Italy Original application Feb. 10, 1958, Ser. No. 714,078. Divided and this application Oct. 28, 1959, Ser. No. 849,389

Claims priority, application Italy, Mar. 29, 1957

11 Claims. (Cl. 18—47)

This invention pertains to porous moulds for moulding under pressure articles composed of natural and synthetic polymers including the vulcanizable ones, and further has reference to moulds having anti-adhesive porous moulding surfaces; and this application is a division of my copending application, Serial No. 714,078, filed February 10, 1958.

One of the greatest difficulties encountered in moulding under pressure articles composed of natural and synthetic polymers, as for instance natural rubber, synthetic rubbers, and synthetic resins, lies in the fact that the air, and the gas generated during the moulding operation, remain trapped between the moulding surfaces of the mould and the material contained inside it, and form bubbles on the surface of the finished product, which consequently becomes defective.

In order to avoid the occurrence of these bubbles and to allow the escape of the occluded air or gas, various solutions have been proposed, but none of them have given really satisfactory results. In particular, porous moulds of metal, intended to allow the release of the air and gas without any outflow of the material to be moulded, have been constructed. Unfortunately, the material contained in the mould tends to fill the pores in the mould which are consequently occluded to such an extent as to make the mould practically unemployable in a short time. It has also been proposed to use moulds in which the surface of the moulding chamber is covered with a smooth anti-adhesive material, not permeable to gases, but here also the obtained results have not been satisfactory.

The present invention aims at eliminating the above indicated difficulties by providing porous moulds, having anti-adhesive moulding surfaces of smaller porosity than that of the mould body.

The mould constructed in accordance with the present invention is characterized in that it comprises a porous metallic body, of which the stratum immediately underlying and including the moulding surface is impregnated with a porous, anti-adhesive plastic material which, for a certain limited depth, partially fills the pores in said impregnated stratum.

The anti-adhesive plastic material used for impregnating the porous moulds of my invention can be any synthetic resin, resistant to temperatures considerably higher than the normal service temperature of the moulds, and is inert, so that it does not form chemical bonds or other bonds due to surface action, with the rubber being moulded. By way of non-limitative example, the following anti-adhesive plastic impregnating materials, which can be employed for the above described purposes, are: polytetrafluoroethylene, polytrifluoromonochloroethylene, and solid silicon resins.

I have discovered that the porous metallic moulds, when impregnated with such a porous anti-adhesive plastic material, have a prolonged permeability to air and gases without any occlusion of the pores of the mould by the mouldable rubber. This result is due to the fact that, owing to the presence of the anti-adhesive plastic material, which is also porous, within the pores of the mould, the porous structure of the treated part of the metallic body of the mould including its moulding surface becomes finer, thus reducing the possibility of the mouldable rubber penetrating within the pores of the mould.

Moreover, the mouldable rubber is less adherent to the anti-adhesive plastic material than to the metal, and since the surface tension of the rubber is modified by the presence of the anti-adhesive plastic material, the residues of moulded rubber remaining in the pores do not cause their total occlusion, and for this reason, such residues can be removed during the subsequent moulding operations.

My improved mould comprises a porous metallic mould body of aluminum, iron, stainless steel or any other suitable metallic material, obtained by metallization, sintering, electro-chemical separation, or any other known method, which is impregnated, at least in the stratum immediately underlying and including the moulding surface, with the anti-adhesive plastic material in a state of solution or dispersion, by dipping, spreading, spraying, or with other like known methods.

This porous metallic mould body is then heated with rapid increase in temperature, in order to evaporate the solvent of the solution, or the dispersing vehicle of the dispersion, and reduce the particles of the mass of anti-adhesive plastic material remaining in the pores to an aggregate in the form of a porous structure having intercommunicating minute cells.

The heat treatment is then continued in order to subject the aggregate to a sintering process so that, when the treatment is over, the anti-adhesive plastic material contained in the pores of the mould appears as a coherent porous mass having a smaller porosity than that of the mould body.

I have discovered that the efficiency of the mould can be improved by using the mould in one or more moulding operations on any vulcanizable natural or synthetic rubber, before treating the porous metallic body with the anti-adhesive plastic material.

The residues of the rubber remaining in the pores of the metallic body are carbonized during the final heat treatment which is carried out at a high temperature, and in this condition they too may be sintered, together with the particles of the anti-adhesive plastic material, thus cooperating to produce an improved porous structure consisting of the composite particles remaining in the pores of the mould.

I have further discovered that a salt, for instance: ammonium nitrate, ammonium chloride, urea, polyacrylate, or any other substance, able under heat to release a gas, can be added to the solution or dispersion of the anti-adhesive plastic material. In the final heat treatment there is first created inside each pore of the mould an aggregate of porous structure consisting of particles of anti-adhesive plastic material containing the gas-forming substance. These particles are then sintered and the gas released causes each particle to assume a more porous structure.

It is to be noted that, by virtue of its metallic body, the mould is resistant to deformation and has very good characteristics of thermal conductivity, whereas this would not be the case if it were completely made of anti-adhesive plastic material.

For best efficiency of the mould, the very minute porous structure of plastic material stratum does not extend to any substantial depth below the moulding surface of the mould, as it is sufficient to provide an impregnated stratum immediately underlying the moulding surface of the mould.

In the drawing, I have illustrated an example of my invention as applied to a hollow mould for moulding a rubber syringe, into which the rubber is introduced in the crude plastic state and compressed air is applied to the mould to cause the rubber to expand and assume the shape of the mould.

Figure 1 of the drawing shows the mould, in half vertical section half elevation; and Figure 2 shows on an enlarged scale a portion of the wall of the mould, as indicated.

In Figure 1, the body of the mould consists of a lower portion 1 and an upper portion 2 which are clamped together in moulding position by a clamp (not shown) which engages annular flanges 3 and 4.

The walls 5 and 6 of body portions 1 and 2 are composed of a porous metal, such as aluminum, iron, stainless steel or other suitable metallic material, which is obtained by metallization, sintering, electro-chemical separation or any other known method.

Walls 5 and 6 are impregnated on their inner moulding surfaces 7 and 8 with an anti-adhesive plastic material which penetrates into a stratum immediately underlying said moulding surfaces to a selected limited depth, as shown at 9 in Figure 2; forming a moulding surface of smaller porosity than that of the wall portions 5 and 6.

The selected limited depth to which the anti-adhesive material penetrates into the porous metallic stratum immediately underlying the moulding surfaces depends upon the nature of the particular anti-adhesive plastic material and the rubber to be moulded, and is determined empirically; the criterion being that said porous metallic stratum shall contain a layer of intercommunicating, minute, space cells sufficient to permit the escape of occluded air and gas which accumulate in said stratum during the moulding operation.

According to the invention, while the plastic material used to impregnate the metallic porous mould has an anti-adhesive nature, said material, on the treated metallic porous mould, has functions specifically different from those of a conventional release agent applied on the non-porous surface of moulds to originate a very smooth moulding surface, and, consequently, to facilitate the detachment of the moulded article from said surface. In fact, according to the invention, the anti-adhesive plastic material serves first of all to constitute, within each treated metallic pore of the mould, a sponge having a very fine porous structure for the escape from the mould of occluded air and gas, and then cooperates to remove the possible very short pegs of the moulded material, as for instance rubber, which are formed in consequence of the penetration of said moulded material within the very fine pores of each sponge of anti-adhesive plastic material under the strong moulding pressure. More precisely said pegs, being in contact with the anti-adhesive plastic material, do not adhere to it and, during the removal of the moulded articles from the mould, they are easily withdrawn, together with said article, out of the very fine pores into which they were formed. Therefore no possibility occurs that said pegs may be separated by breaking from said article during its removal from the mould and that they may remain into the fine pores of said sponge, thus clogging them. These pegs have a microscopic size and their presence in the whole is revealed by the opaque appearance of the moulded article. In this way the clogging of the very fine porous structure of the sponge of the anti-adhesive plastic material existing in each treated metallic pore of the mould is avoided, and the air can escape out through said very fine porous structure during the moulding operation.

While I have hereinabove mentioned the substance to be moulded as rubber, I desire it to be understood that this term is used in a generic sense, to include natural rubber, synthetic rubbers, synthetic resins, and other similar substances.

I claim:

1. A porous mould for moulding under pressure rubber articles comprising: a porous metallic body having a stratum immediately underlying and including its moulding surface which is impregnated with a porous, anti-adhesive, sintered, plastic material that penetrates for a selected limited depth into and partially fills the pores of said stratum immediately adjacent its moulding surface, whereby said surface has a smaller porosity than that of said body.

2. A porous mould as in claim 1, wherein said porous anti-adhesive plastic material is polytetrafluoroethylene.

3. A porous mould as in claim 1, wherein said porous anti-adhesive plastic material is polytrifluoromonochloroethylene.

4. A porous mould as in claim 1, wherein said porous anti-adhesive plastic material is a silicon resin.

5. A porous mould for moulding under pressure rubber articles comprising: a porous metallic body in which at least a stratum immediately underlying and including its moulding surface has its pores partially filled with an anti-adhesive, sintered, plastic material in the form of a microporous structure of such selected porosity that it retains the rubber and facilitates the escape of any gas that may be occluded during the moulding operation.

6. A porous mould for moulding under pressure rubber articles, comprising a porous, metallic body having a stratum immediately underlying and including its moulding surface impregnated with a particulate anti-adhesive, sintered, plastic material whose particles partially fill the pores of said stratum where they are sintered and form an aggregate of smaller porosity than that of said body.

7. A mould according to claim 6, wherein is added to said material a substance which is heated and forms within said particles a gas that, upon escaping from said particles, improves their porosity.

8. A mould according to claim 6, wherein the said plastic material is applied to the moulding surface of the mould by dipping said surface into a solution of said plastic material in a liquid solvent.

9. A mould according to claim 6, wherein the said plastic material is applied to the moulding surface of the mould by dipping said surface into a dispersed suspension of said plastic material in a liquid vehicle.

10. A mould according to claim 6, wherein the said plastic material is applied to the moulding surface of the mould by spraying said surface with a solution of said plastic solution dissolved in a liquid solvent.

11. A mould according to claim 6, wherein the said plastic material is applied to the moulding surface of the mould by spraying said surface wtih a dispersed suspension of said plastic material in a liquid vehicle.

References Cited in the file of this patent

UNITED STATES PATENTS

| | | |
|---|---|---|
| 1,592,536 | O'Neill | July 13, 1926 |
| 1,662,365 | Constock | Mar. 13, 1928 |
| 2,297,248 | Rudolph | Sept. 29, 1942 |
| 2,494,329 | Carlin | Jan. 10, 1950 |
| 2,689,380 | Tait | Sept. 21, 1954 |
| 2,779,062 | Stastny | Jan. 29, 1957 |
| 2,811,408 | Braley | Oct. 29, 1957 |
| 2,488,446 | Swiss | Nov. 15, 1959 |

FOREIGN PATENTS

| | | |
|---|---|---|
| 657,085 | Great Britain | Sept. 12, 1951 |
| 690,031 | Great Britain | Apr. 8, 1953 |
| 811,101 | Great Britain | Apr. 2, 1959 |